(12) United States Patent
Sierra et al.

(10) Patent No.: US 11,988,253 B2
(45) Date of Patent: May 21, 2024

(54) BEARING ASSEMBLY FOR ROLLER BOOT ARRANGEMENT

(71) Applicant: SCHAEFFLER TECHNOLOGIES AG & CO. KG, Herzogenaurach (DE)

(72) Inventors: Kleberson Sierra, Sorocaba (BR); Elias Ferreira Machado, Sorocaba (BR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/902,312

(22) Filed: Sep. 2, 2022

(65) Prior Publication Data

US 2023/0417286 A1  Dec. 28, 2023

Related U.S. Application Data

(63) Continuation-in-part of application No. 17/749,777, filed on May 20, 2022.

(51) Int. Cl.
*F16C 33/58* (2006.01)
*F16C 19/46* (2006.01)

(52) U.S. Cl.
CPC .......... *F16C 33/583* (2013.01); *F16C 19/463* (2013.01)

(58) Field of Classification Search
CPC ........ F16C 19/36; F16C 19/361; F16C 19/44; F16C 19/46; F16C 19/463; F16C 33/4605; F16C 33/583; F16C 33/585; F16C 33/586; F16C 33/588; F16C 33/605
See application file for complete search history.

(56) References Cited

U.S. PATENT DOCUMENTS

| 4,869,604 A * | 9/1989 | Hill ..................... F16C 33/588 384/564 |
| 5,458,421 A * | 10/1995 | Giese .................. F16H 57/0434 384/481 |
| 10,995,793 B1 | 5/2021 | Sierra |
| 2001/0006566 A1* | 7/2001 | Akamatsu ............... F16C 33/64 384/559 |
| 2018/0163784 A1* | 6/2018 | Wollboldt ........... F16C 33/7809 |

FOREIGN PATENT DOCUMENTS

| DE | 966285 C | 8/1957 |
| DE | 4230965 | * 3/1994 |
| DE | 102010014742 A1 | 10/2011 |
| DE | 102020114132 A1 | 12/2021 |
| FR | 2558548 | * 7/1985 |
| JP | 2004316671 | * 11/2004 |

OTHER PUBLICATIONS

Translation of FR2558548 obtained Oct. 24, 2023.*
Translation of JP2004316671 obtained Oct. 25, 2023.*
Permaglide plain bearings, Catalogue 706, INA Bearing Company Ltd, 2002.

* cited by examiner

Primary Examiner — James Pilkington
(74) Attorney, Agent, or Firm — Volpe Koenig

(57) ABSTRACT

A bearing assembly is disclosed herein that is configured for use in a rubber boot arrangement. The bearing assembly includes an outer ring, an inner ring, a plurality of rolling elements supported between the outer ring and the inner ring, and a cage configured to retain the plurality of rolling elements. A thrust washer is provided that is configured to prevent wear, abrasion, or other damage to the bearing components. The thrust washer can be configured to be directly attached to any of the bearing components, such as the inner ring or the inner sleeve.

19 Claims, 15 Drawing Sheets

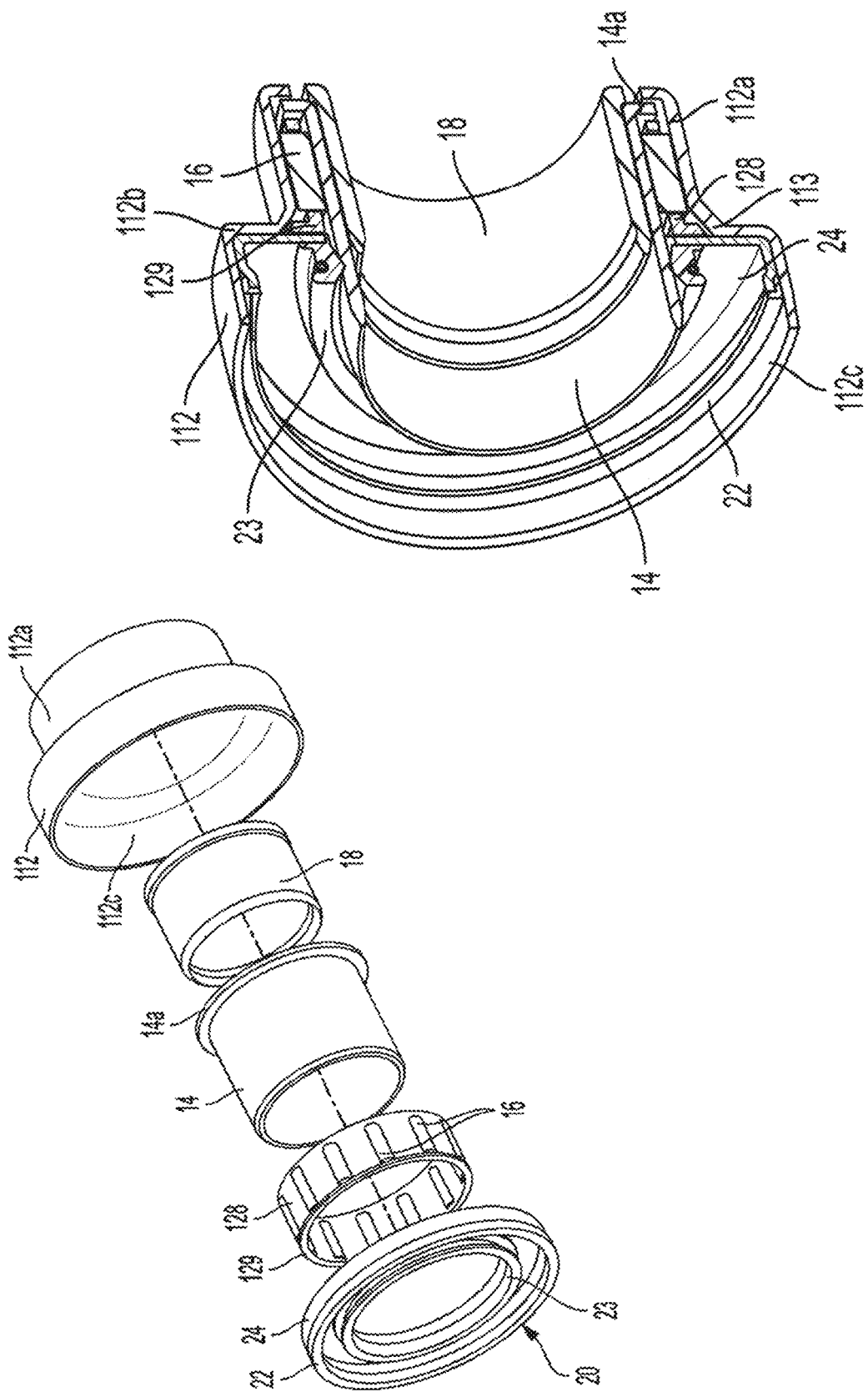

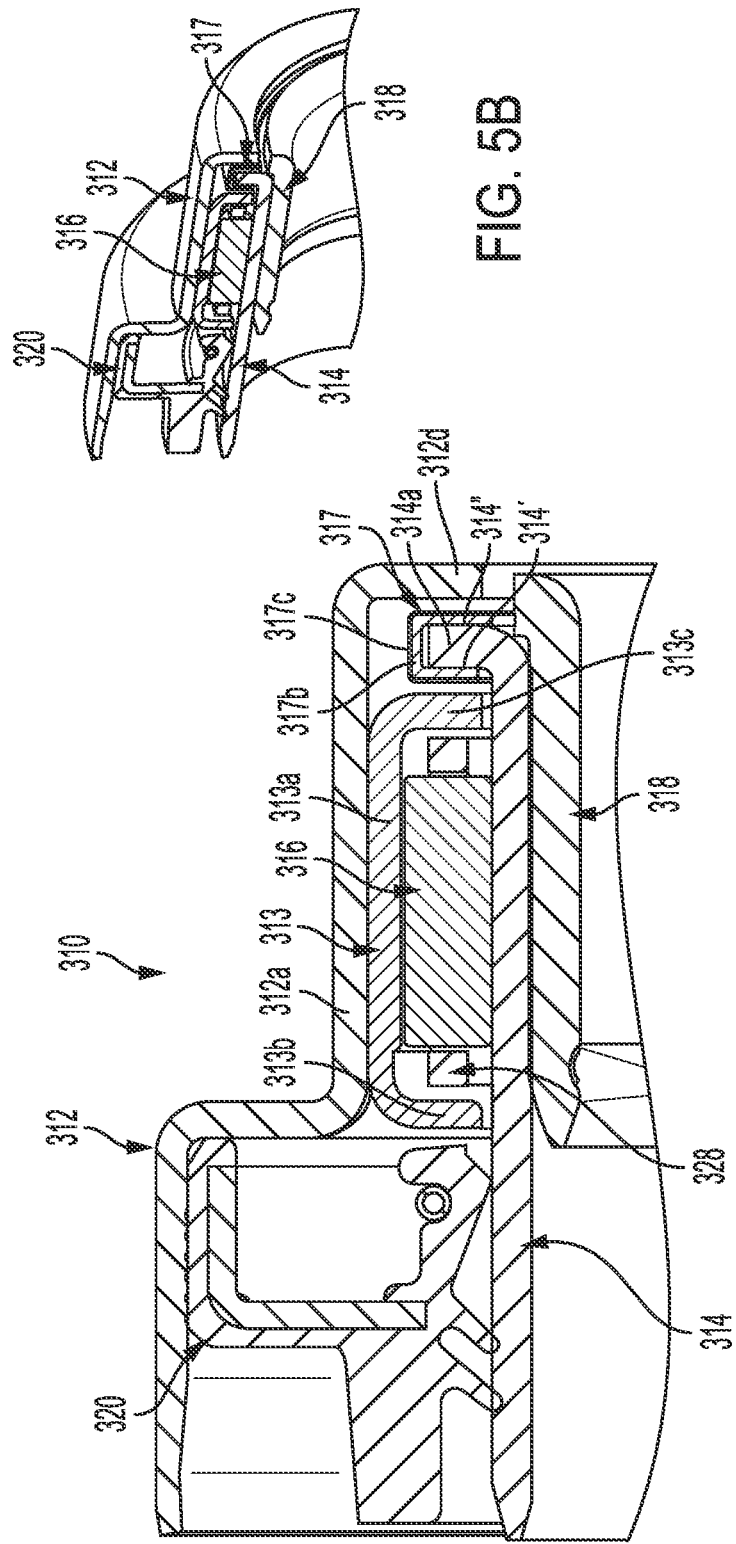

BEARING ASSEMBLY FOR ROLLER BOOT ARRANGEMENT

INCORPORATION BY REFERENCE

The following document is incorporated by reference in its entirety as if fully set forth herein: U.S. patent application Ser. No. 17/749,777, filed on May 20, 2022.

FIELD OF INVENTION

The present disclosure relates to a bearing assembly, and more specifically relates to a bearing assembly for a roller boot arrangement.

BACKGROUND

Roller boot arrangements can be used in differential applications, as is well known in the art. Referring to FIG. 1A, a differential assembly 1a is illustrated, along with a half-shaft 1b, a gear box housing 1c, a rubber boot 1d, a bearing assembly 1e, and tripod rollers 1f. FIG. 1B illustrates further details of the interface between a bearing assembly 2a and a rubber boot 2b. As shown in FIG. 1B, a cap 2c can be arranged around a half-shaft 2d and axially adjacent to the bearing assembly 2a. A clip band 2e can be provided for fixation of the rubber boot on the bearing assembly.

FIGS. 1C and 1D illustrate more detailed configurations for the bearing assembly in a rubber boot assembly. As shown in FIG. 1C, a seal assembly 3a is provided adjacent to a bearing 3b that includes spherical rolling elements. As shown in FIG. 1D, a seal assembly 4a is provided adjacent to a bearing 4b that includes needle rollers.

Based on the relative complexity of the seal assemblies and adjacent components in these rubber boot bearing assemblies, it can be time consuming and labor intensive to assemble each of the components. Specifically, it would be desirable to reduce the number of parts, while also ensuring that the bearing assembly components are sufficiently retained within the overall assembly. It would further be desirable to provide improved axial support for the bearing components such that abrasion, wear, and damage to the bearing components is reduced or avoided entirely.

SUMMARY

A bearing assembly is disclosed herein that can be configured for use in a roller boot arrangement. Specifically, the bearing assembly includes an outer ring, an inner ring, a plurality of rolling elements supported between the outer ring and the inner ring, and a cage configured to retain the plurality of rolling elements.

A thrust washer can be provided that is arranged on a first axial side of the plurality of rolling elements and the cage. The thrust washer can be axially positioned between the cage and a radial flange of the outer ring. The thrust washer can be directly attached to the inner ring, such that the thrust washer faces the cage on a first axial side and faces a portion of the outer ring on a second axial side.

The thrust washer can be comprised of a body and a coating. The body can be formed from sheet metal and the coating can be formed from a low friction material.

The thrust washer can be attached to a radial flange of the inner ring, in one example. The thrust washer can be configured to be arranged on both a first axial side and a second axial side of the radial flange of the inner ring. The thrust washer can completely surround an outer edge of the inner ring.

The thrust washer can be attached to the inner ring via an interference fit. The thrust washer can include a first mating feature, and the radial flange of the inner ring can include a second mating feature. The first mating feature and the second mating feature can be configured to prevent relative movement between the thrust washer and the inner ring.

An inner sleeve can be arranged radially inward from the inner ring. The inner sleeve can function as an adapter such that the bearing assembly can be used with different size shafts.

A seal assembly can also be included that is arranged on a second axial side of the plurality of rolling elements and the cage. The seal assembly can provide a sealing interface with both the outer ring and the inner ring.

A similar configuration can also be provided in which the thrust washer is attached to the inner sleeve.

A thrust washer-bearing ring combination is also disclosed herein that includes a thrust washer having a sheet metal body and a coating, and a bearing ring having a raceway for supporting rolling elements and a radial flange. The thrust washer is configured to be directly attached to the radial flange of the bearing ring and is configured to face a cage for rolling elements on one side and a radial flange of an opposite bearing ring on another side.

The thrust washer can be configured to cover at least a portion of a first axial side and a second axial side of the radial flange of the inner ring. The thrust washer can include a first mating feature, and the radial flange of the inner ring can include a second mating feature configured to mate with the first mating feature.

The first mating feature can be formed as a tab and the second mating feature can be formed as a slot. One of ordinary skill in the art would understand that the mating features can vary.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings:

FIG. 3B is an exploded perspective view of the bearing assembly of FIG. 3A.

FIG. 3C is a perspective cross-sectional view of the bearing assembly of FIGS. 3A and 3B.

FIG. 5A is a cross-sectional view of a bearing assembly according to fourth embodiment.

FIG. 5B is a perspective cross-sectional view of the bearing assembly of FIG. 5A.

DETAILED DESCRIPTION OF THE PREFERRED EMBODIMENTS

Certain terminology is used in the following description for convenience only and is not limiting. "Axially" refers to a direction along an axis (X) of an assembly. "Radially" refers to a direction inward and outward from the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1A:
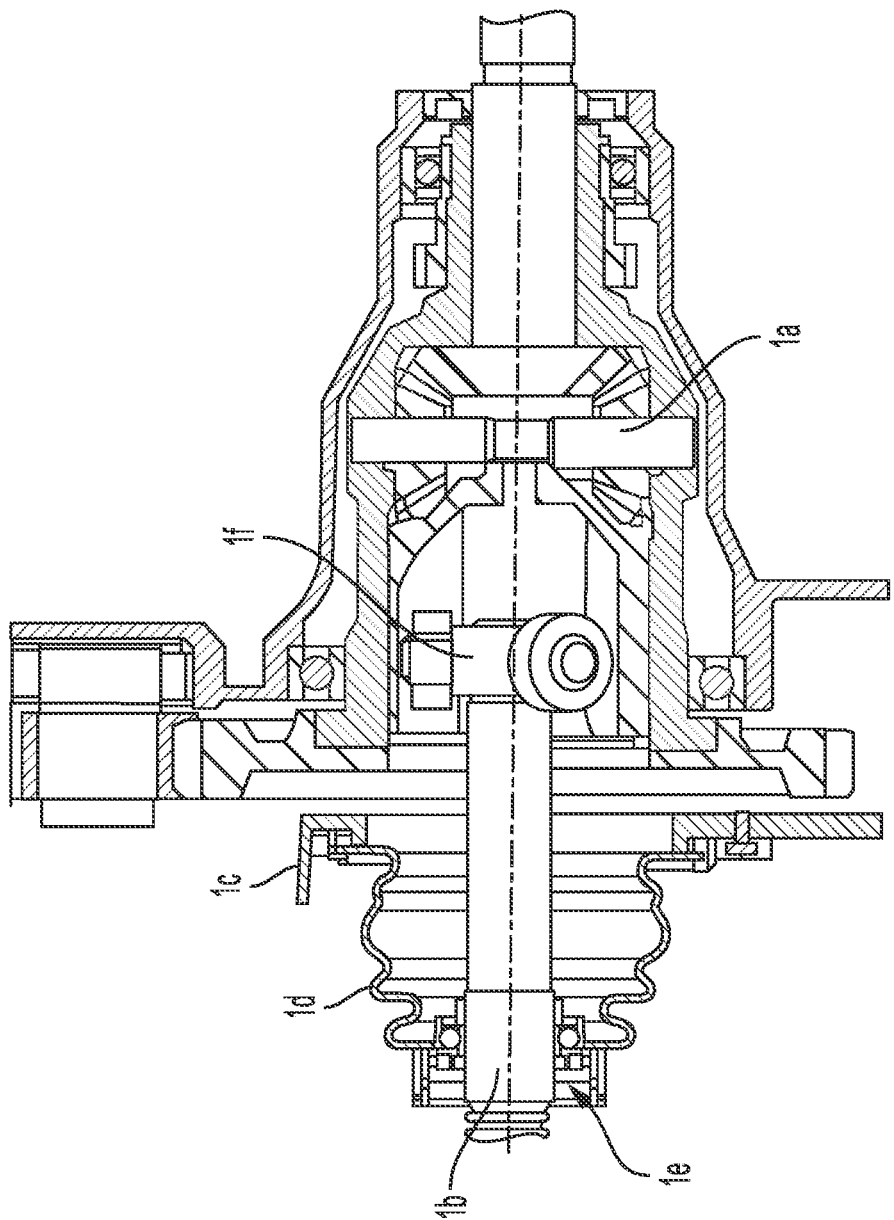
FIG. 1A is a cross-sectional view of an assembly including a differential and rubber boot assembly according to the prior art.
Figure 1B:
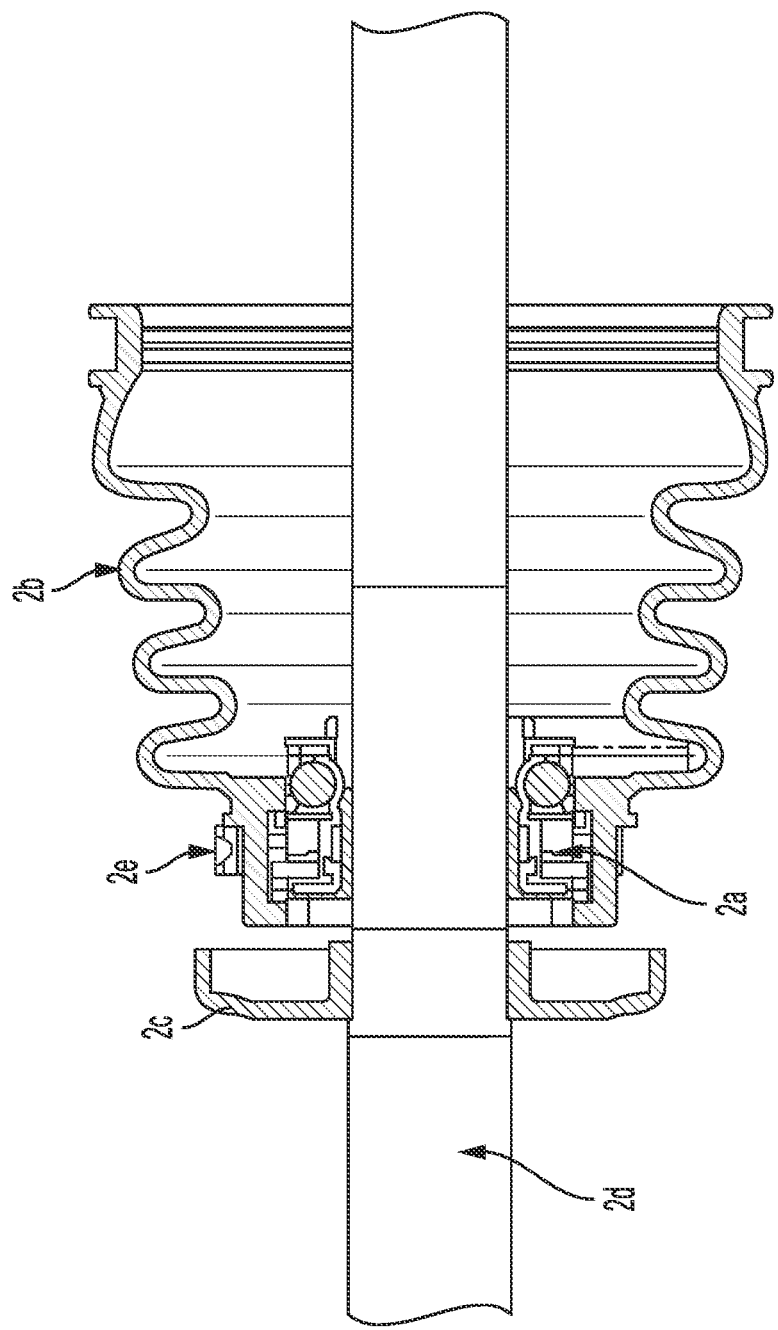
FIG. 1B is a cross-sectional view of a rubber boot assembly according to the prior art.
Figure 1D:
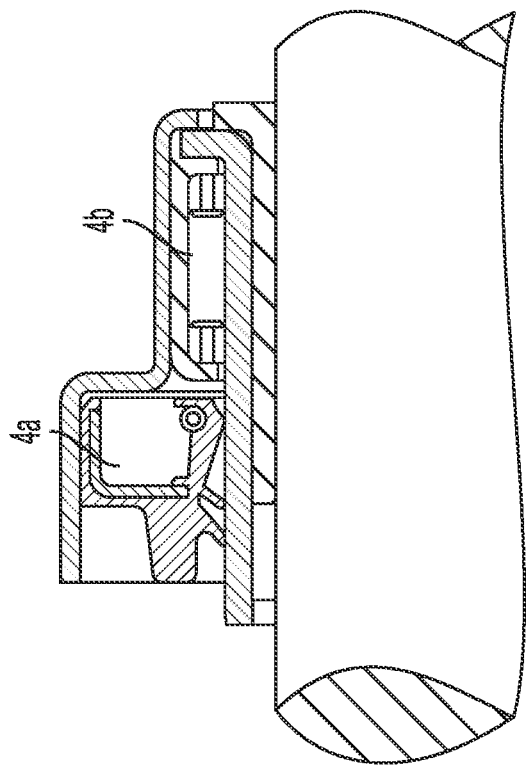
FIG. 1D is a cross-sectional view of a rubber boot bearing assembly including needle rollers according to the prior art.
Figure 1C:
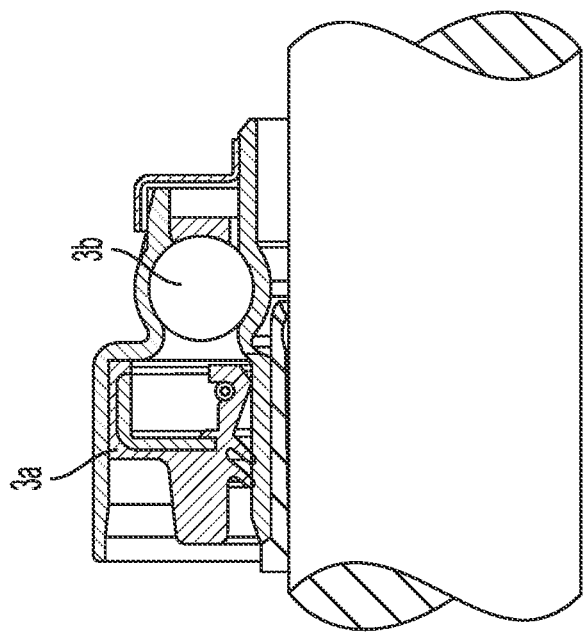
FIG. 1C is a cross-sectional view of a rubber boot bearing assembly including spherical rolling elements according to the prior art.
Figure 2A:
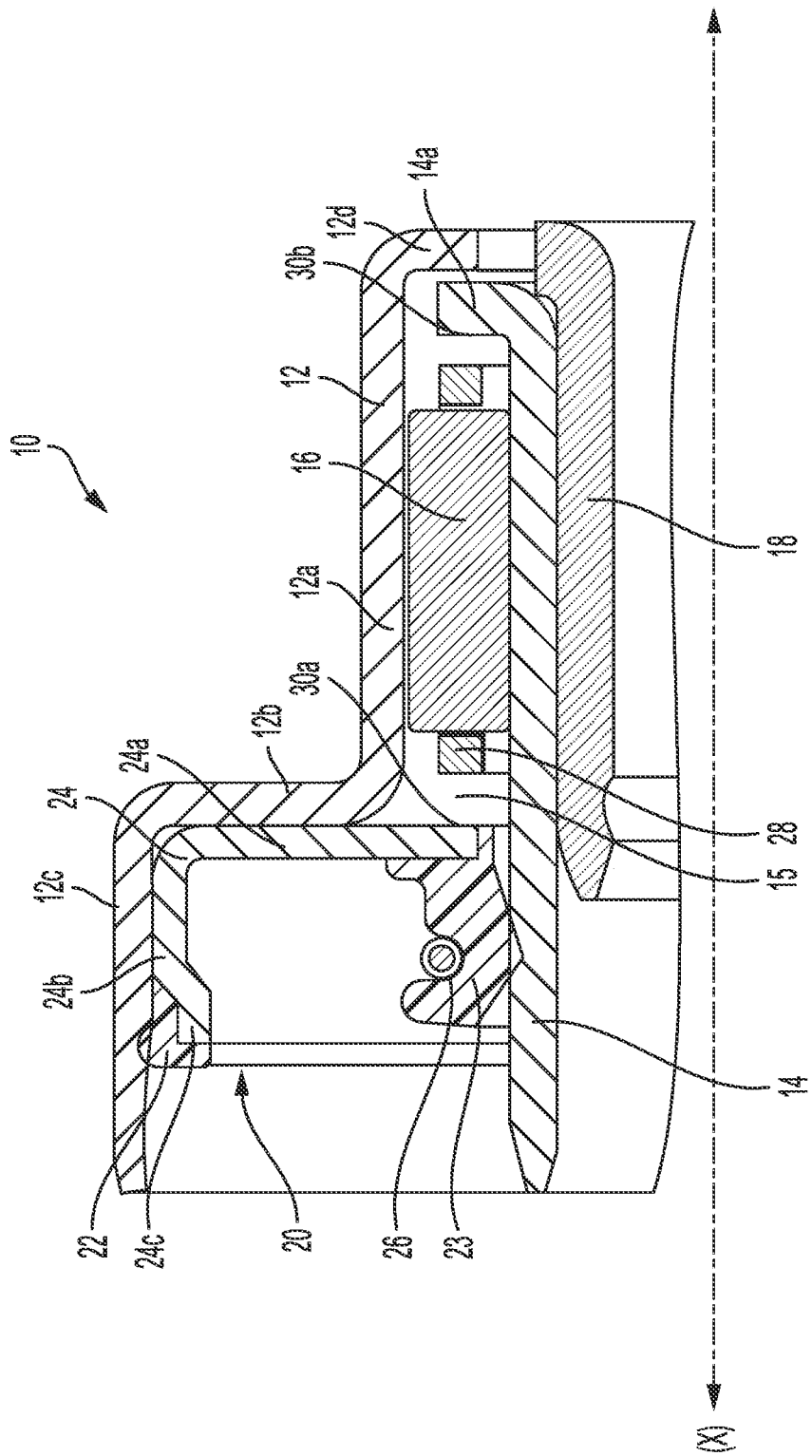
FIG. 2A is a cross-sectional view of a bearing assembly for a rubber boot assembly according to a first embodiment.
Figure 2B:
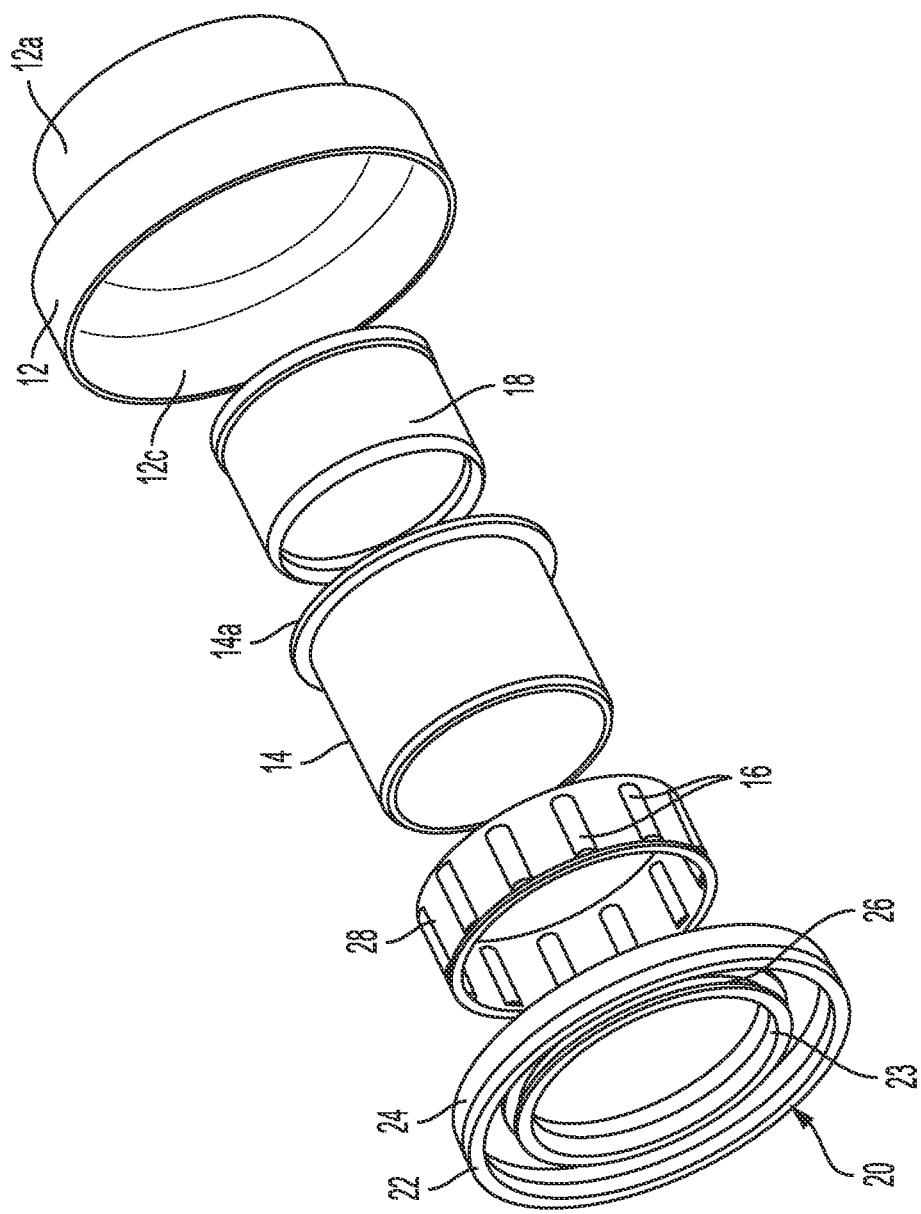
FIG. 2B is an exploded perspective view of the bearing assembly of FIG. 2A.
Figure 2C:
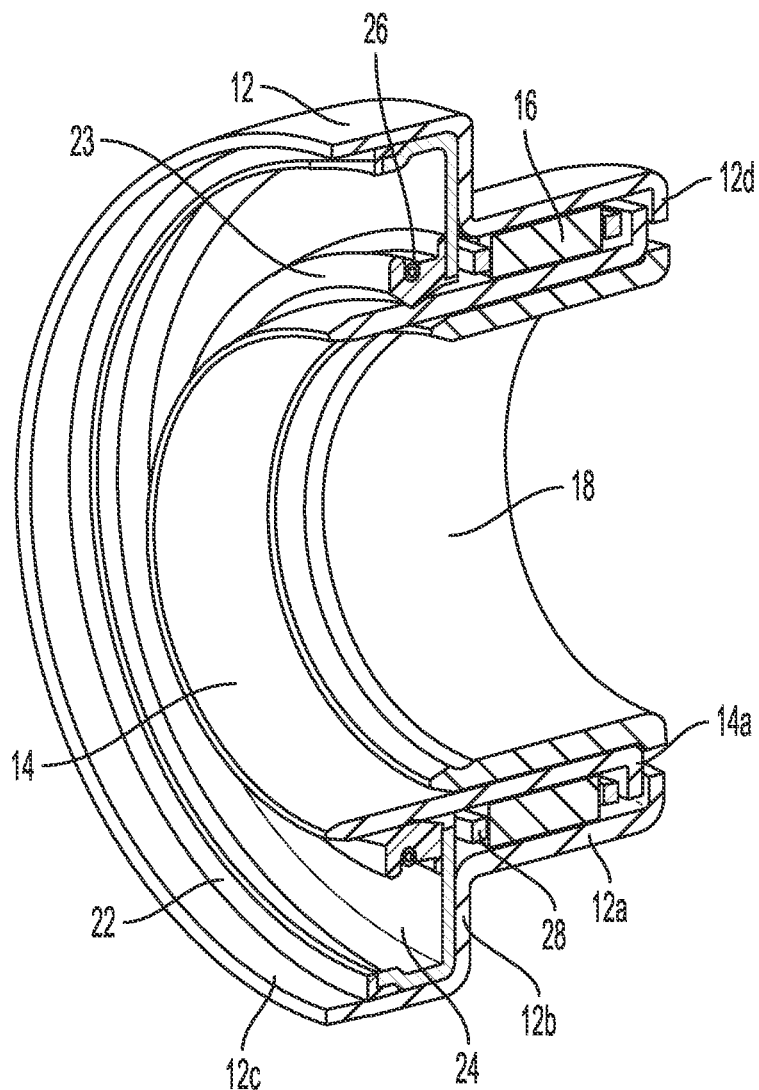
FIG. 2C is a perspective cross-sectional view of the bearing assembly of FIGS. 2A and 2B.

As shown in FIGS. 2A-2C a bearing assembly 10 for a roller boot arrangement is disclosed herein. The bearing assembly 10 generally includes an outer ring 12, an inner ring 14, rolling elements 16 supported between the outer ring 12 and the inner ring 14, and a cage 28 configured to retain the rolling elements 16. One of ordinary skill in the art would understand that the cage 28 can be omitted in some configurations or applications.

The outer ring 12 can generally include a first axial flange 12a, a first radial flange 12b, and a second axial flange 12c. The first radial flange 12b can be arranged in a medial position between the first axial flange 12a and the second axial flange 12c to define a connection flange. A second radial flange 12d can also be arranged on a terminal end of the first axial flange 12a.

The bearing assembly 10 can further include an inner sleeve 18, 118 arranged radially inward from the inner ring 14. The inner sleeve 18, 118 can be formed as a metallic component that is used to adjust the overall bearing inner diameter to an associated shaft diameter. The bearing assembly 10 can therefore be adapted for use with shafts of varying diameters. In this way, the inner sleeve 18, 118 can act as an adaptor type element that allows the bearing assembly to be mounted onto half shafts of varying diameters.

A seal assembly 20 is provided that generally is configured to retain oil for the gear box transmission system and bearing assembly 10. Specifically, the seal assembly 20 is configured to seal an oil retention pocket 15 that is configured to lubricate the rolling elements 16. The seal assembly 20 can comprise at least one sealing element 22, 23 and a seal insert 24. The sealing element 22, 23 can be formed from an elastomeric material or rubber material suitable to deform and provide a sealing interface with a respective contact surface. The seal insert 24 can be formed as a rigid component, such as a metallic component.

The seal assembly 20 can further include a biasing element 26 configured to engage with the second sealing element 23. The biasing element 26 can be formed as a helicoidal spring, in one example. The biasing element 26 can generally be configured to press or drive the second sealing element 23 radially inward to engage with the inner ring 14.

The seal insert 24 is configured to directly contact at least one of the outer ring 12 or the inner ring 14, and can be configured to directly contact two regions, areas, or points on one of the rings 12, 14. The seal insert 24 can have an L-shaped profiled and can include a radial flange 24a and an axial flange 24b. Preferably, the seal insert 24 is configured to directly contact the outer ring 12, and is configured to contact an interior surface of the second axial flange 12c and an interior surface of the first radial flange 12b. More preferably, the seal insert 24 is configured to have an interference or press fit with an interior surface of the outer ring 12. The seal insert 24 is also configured to define a first axial stop face 30a for the cage 28. As used in this context, the term "axial stop face" refers to an axial stopper or abutment such that the rolling elements 16 and the cage 28 are axially retained or limited in an axial direction. If the cage 28 is omitted, then the axial stop faces are configured to prevent axial movement of the rolling elements 16.

The at least one sealing element 22, 23 can include a first sealing element 22 in contact with both a radially inner surface of the outer ring 12 and the seal insert 24. The first sealing element 22 can be formed as an elastomeric sealing component that is over-molded or co-molded with the seal insert 24. The axial flange 24b of the seal insert 24 can include a bent portion 24c (i.e. offset from a remainder of the axial flange 24b) dimensioned to receive a portion of the first sealing element 22. The axial flange 24b of the seal insert 24 can be configured to provide an interference fit or press-fit with the second axial flange 12c of the outer ring 12. The radial flange 24a can be configured to directly contact the first radial flange 12b of the outer ring 12.

The at least one sealing element can also include a second sealing element 23 that is attached to the seal insert 24 and in contact with at least a radially outer surface of the inner ring 14. The second sealing element 23 can be over-molded or co-molded with the seal insert 24. The second sealing element 23 can define a pocket dimensioned to receive the biasing element 26.

As shown in FIGS. 2A-2C, the inner ring 14 can include a radially outward flange 14a configured to define a second axial stop face 30b for the rolling elements 16 and the cage 28.

Figure 3A:
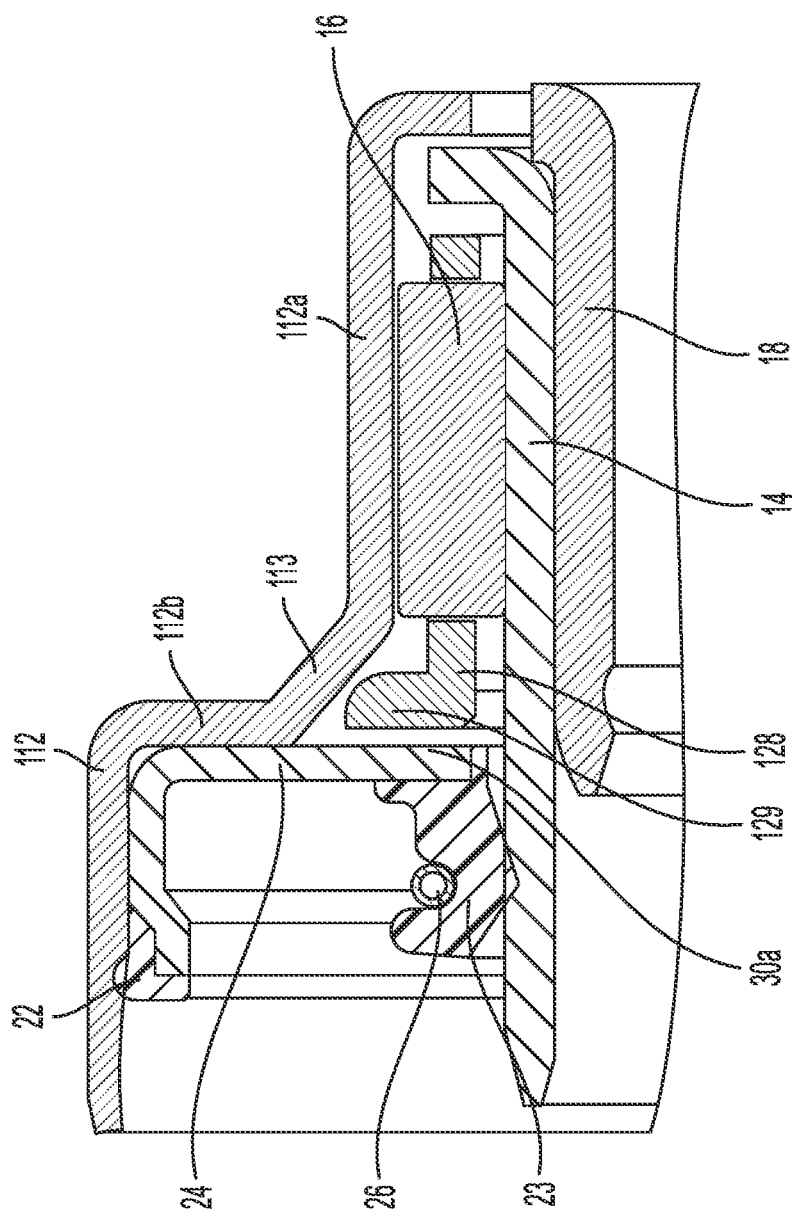
FIG. 3A is a cross-sectional view of a bearing assembly for a rubber boot assembly according to a second embodiment.

As shown in FIGS. 3A-3C, the cage 128 can include a radial flange 129 configured to contact the first axial stop face 30a of the seal insert 24. The radial flange 129 of the cage 128 can extend radially outward, and can extend radially beyond a radially outer surface of the rolling elements 16. Referring to FIGS. 3A-3C, the outer ring 112 can include a slanted portion 113 (i.e. angled or otherwise not extending in a purely radial or axial direction) defining an interior space dimensioned to receive the radial flange 129 of the cage 128. The slanted portion 113 of the outer ring 112 can be provided between a first axial flange 112a and a first radial flange 112b, and can connect these two portions of the outer ring 112.

Figure 4A:
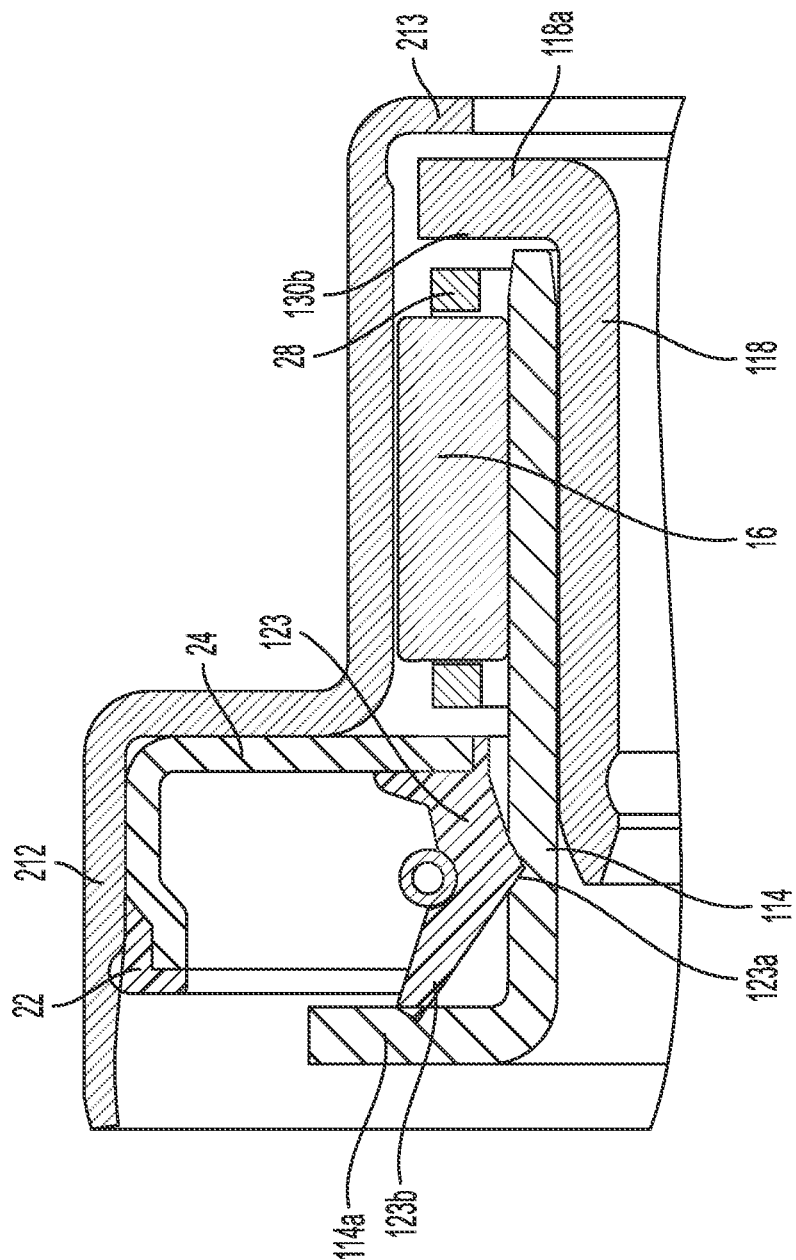
FIG. 4A is a cross-sectional view of a bearing assembly for a rubber boot assembly according to a third embodiment.
Figure 4C:
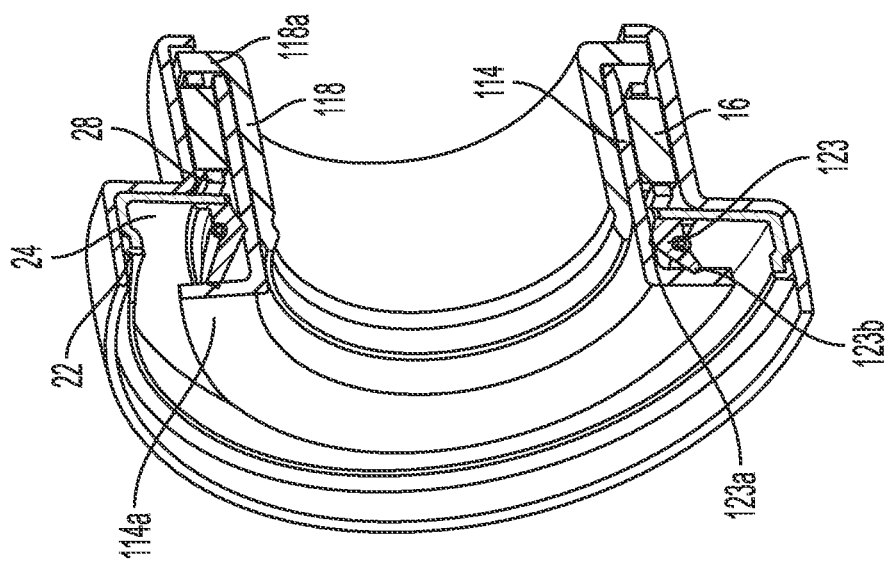
FIG. 4C is a perspective cross-sectional view of the bearing assembly of FIGS. 4A and 4B.
Figure 4B:
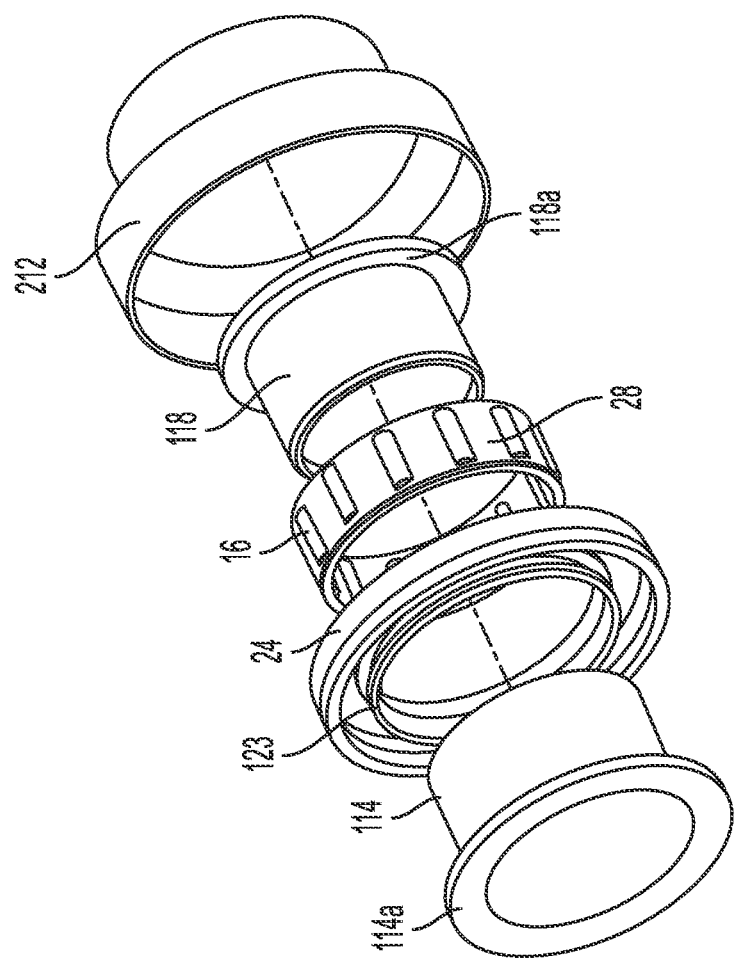
FIG. 4B is an exploded perspective view of the bearing assembly of FIG. 4A.
Figure 5D:
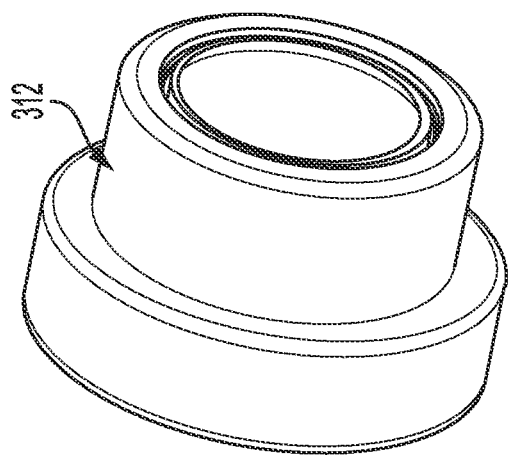
FIG. 5D is a side perspective view of the bearing assembly of FIGS. 5A-5C.
Figure 5C:
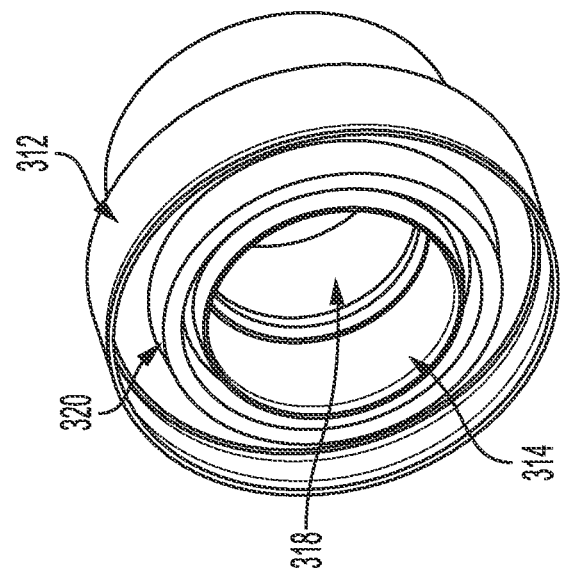
FIG. 5C is an end perspective view of the bearing assembly of FIGS. 5A and 5B.

As shown in FIGS. 4A-4C, the second sealing element 123 can also be configured to contact a radially outward flange 114a of the inner ring 114. Referring to FIG. 4A, the second sealing element 123 includes a first sealing lip 123a configured to engage with a radially outer surface of the inner ring 114, and also includes a second sealing lip 123b configured to engage with an axial surface formed on the radially outward flange 114a of the inner ring 114.

Referring specifically to the configuration shown in FIGS. 4A-4C, the inner sleeve 118 can comprise a radial flange 118a configured to define a second axial stop face 130b for the cage 28 and the rolling elements 16. The outer ring 212 can include a radially inward flange 213 such that the radial flange 118a of the inner sleeve 118 is arranged between the cage 28 and the radially inward flange 213 of the outer ring 212.

FIGS. 5A-9 disclose additional embodiments for a bearing assembly including a seal assembly and a thrust bearing arrangement that is configured to provide axial support for the rolling elements, the cage, and other aspects of the bearing assembly.

In one configuration, a bearing assembly 310 is provided, as shown in FIGS. 5A and 5B, that includes an outer ring 312, an inner ring 314, a plurality of rolling elements 316 supported between the outer ring 312 and the inner ring 314, and a cage 328 configured to retain the plurality of rolling elements 316. The components of the bearing assembly can be the same as the other embodiments described herein and similar components are identified using similar reference numerals (i.e. outer ring 12, outer ring 312 and axial flange 312a), unless specified herein.

A seal assembly 320 can be arranged on one axial side of the plurality of rolling elements 316 and the cage 328. The seal assembly 320 can generally provide a sealing interface with both the outer ring 312 and the inner ring 314. The seal assembly 320 can include the same components and function in the same manner as the seal assembly 20.

A thrust washer 317 can be arranged on another axial side of the plurality of rolling elements 316 and the cage 328. The thrust washer 317 can be arranged on an opposite axial side of the rolling elements 316 and the cage 328 from the seal assembly 320. The thrust washer 317 can be axially positioned between the cage 328 and a radial flange 312d of the outer ring 312. The thrust washer 317 can either be directly positioned between the cage 328 and the radial flange 312d of the outer ring 312, or intermediate components can be arranged therebetween. For example, in one configuration, a raceway ring 313 can be arranged inside of the outer ring 312 and can be configured to directly contact the rolling elements 316. The raceway ring 313 can include an axial portion 313a and two radial flanges 313b, 313c on either end of the axial portion 313a. One of the radial flanges 313c can be arranged to directly face the thrust washer 317.

Figure 8:
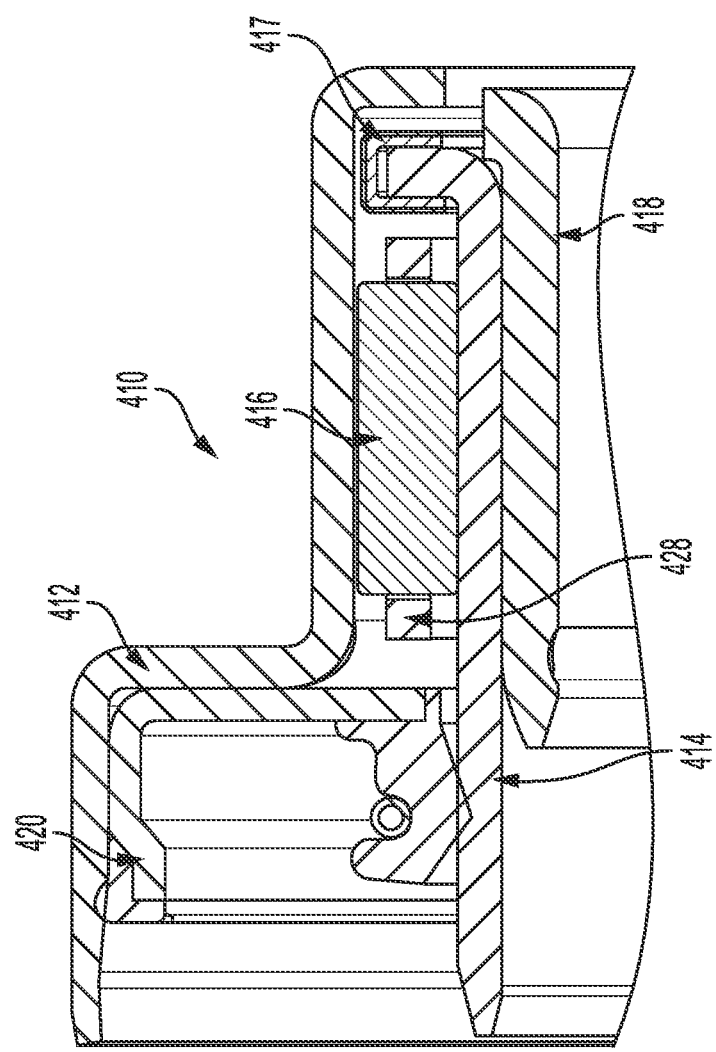
FIG. 8 is a cross-sectional view of a bearing assembly according to a fifth embodiment.

As shown in FIG. 8, in another bearing assembly 410, the raceway ring 313 can be omitted. All other features or components in FIG. 8, i.e. seal assembly 420, rings 412, 414, rolling elements 416, cage 428, inner sleeve 418, thrust washer 417, are otherwise similar to the configuration shown in FIGS. 5A and 5B and use the same reference numerals as used in FIGS. 5A and 5B.

Returning to the configuration of FIGS. 5A-5D, the thrust washer 317 can be a unitary part, or can be comprised of multiple components, such as a body 317b and a coating 317c. The body 317b can be formed from sheet metal, in one example. The coating 317c can be formed from a low friction material, such as graphite or polytetrafluoroethylene (PTFE). The sheet metal for the body 317b can have a thickness of 0.15 mm-1.30 mm, in one example.

The thrust washer 317 can be directly attached to the inner ring 314. In another configuration, the thrust washer 317 can be attached to the outer ring 312. In yet another configuration, the thrust washer 317 can be attached to the raceway ring 313. This attachment can be achieved in a variety of configurations. The thrust washer 317 can be attached to a radial flange 314a of the inner ring 314, for example. The radial flange 314a can extend radially outward from a base portion of the inner ring 314, and can overlap with the radial flange 312d of the outer ring 312.

The thrust washer 317 can be configured to be arranged on both a first axial side 314' and a second axial side 314" of the radial flange 314a of the inner ring 314. Based on this configuration, the thrust washer 317 wraps around a terminal end of the radial flange 314a of the inner ring 314.

The thrust washer 317 can be attached to the inner ring 314 via an interference fit, for example. One of ordinary skill in the art would understand that other connections could be achieved between the thrust washer 317 and the inner ring 314.

Figure 6A:
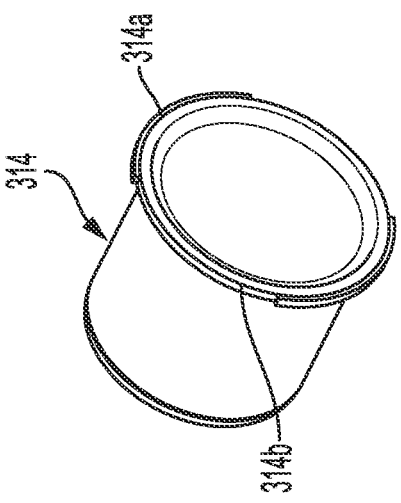
FIG. 6A is a perspective view of an inner ring from the bearing assembly of FIGS. 5A-5D.
Figure 6B:
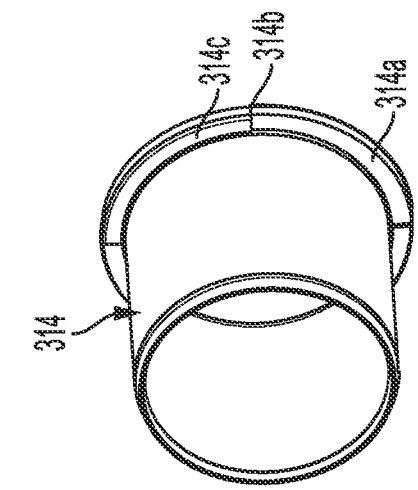
FIG. 6B is another perspective view of the inner ring from FIG. 6A.
Figure 6C:
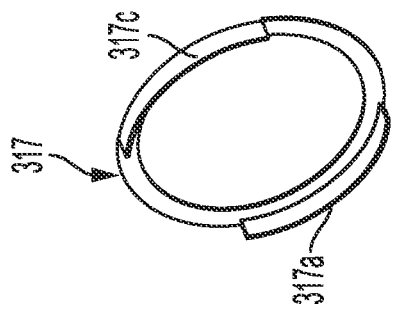
FIG. 6C is a perspective view of a thrust washer from the bearing assembly of FIGS. 5A-5D.

The thrust washer 317 can include a first mating feature 317a, and the radial flange 314a of the inner ring 314 can include a second mating feature 314b. At least a portion of the thrust washer 317 can include the coating 317c, which is shown on an outer surface of the first mating feature 317a, for example in FIG. 6C. A portion of the second mating feature 314b can also include a coating 314c as shown in FIG. 6B. These mating features can include a slot, which is shown as the second mating feature 314b on the inner ring 314, or can include a tab, which is shown as the first mating feature 317a on the thrust washer 317. As shown in FIGS. 6A and 6C, the first mating feature 317a can be formed as a tab that extends in an axial direction. The second mating feature 314b can be formed as a slot defined with a predetermined circumferential extent that is configured to receive the first mating feature 317a. The exact shape and interface between the thrust washer 317 and the inner ring 314 can vary. In one example, an outer diameter of the radial flange 314a can be the same as an outer diameter of the thrust washer 317. The first mating feature 317a can be have an initial profile of axial prong or extension, which is subsequently inserted within the second mating feature 314b and bent to secure the thrust washer 317 with the inner ring 314. The first mating feature 317a and the second mating feature 314b can be configured to prevent relative movement between the thrust washer 317 and the inner ring 314.

An inner sleeve 318, similar to the inner sleeve 18, 118, can be arranged radially inward from the inner ring 314. As shown in FIGS. 5A and 5B, the inner sleeve 318 can include a generally circular profile.

Figure 9:
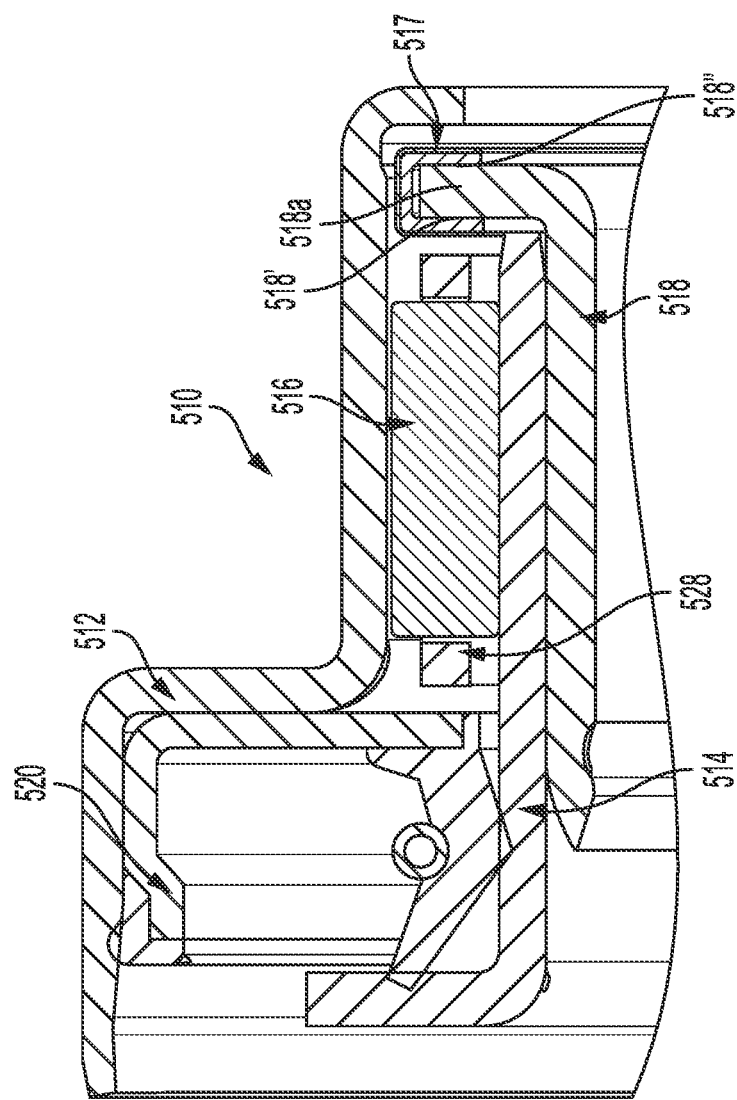
FIG. 9 is a cross-sectional view of a bearing assembly according to a sixth embodiment.

As shown in FIG. 9, another bearing assembly 510 can be provided that includes an outer ring 512 and an inner sleeve 518 with a different profile than sleeve 318, and that includes a radial flange 518a. In this configuration, the thrust washer 517 can be attached to a portion of the inner sleeve 518 instead of the inner ring 514. For example, the thrust washer 517 can be attached to the radial flange 518a of the inner sleeve 518. The thrust washer 517 can be configured to be arranged on both a first axial side 518' and a second axial side 518" of the radial flange 518a of the inner sleeve 518. The thrust washer 517 can have the same features as the thrust washer 317.

Figure 7A:
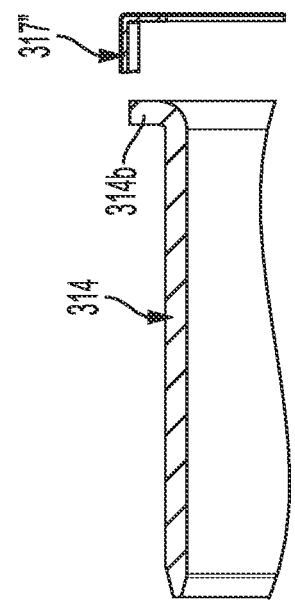
FIG. 7A is a cross-sectional view of the inner ring and thrust washer of the bearing assembly during a first assembly step.
Figure 7B:
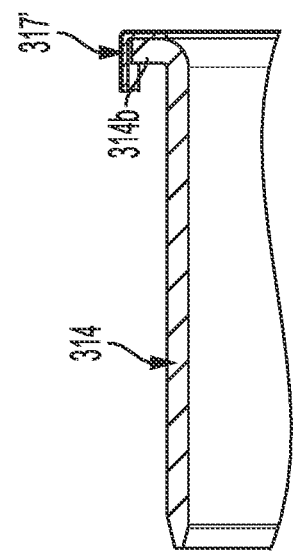
FIG. 7B is a cross-sectional view of the inner ring and the thrust washer during a second assembly step.
Figure 7C:
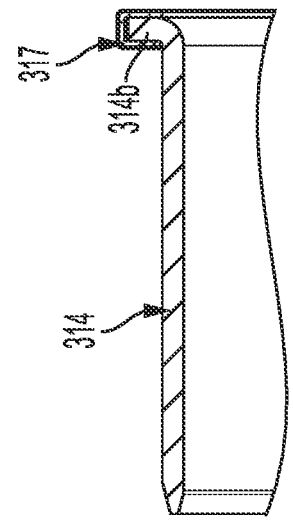
FIG. 7C is a cross-sectional view of the inner ring and the thrust washer during a third assembly step.

A method of providing a thrust washer arrangement for a bearing assembly is also disclosed herein. The method can include attaching a thrust washer 317 to one of the components of the bearing assembly. For example, as shown in FIGS. 7A-7C, the method can include providing a thrust washer 317" in a pre-installed state. As shown in FIG. 7A, the thrust washer 317" can initially have an L-shaped profile, with a single radial flange and a single axial flange. The method can include, as shown in FIG. 7B, arranging the thrust washer 317' adjacent to a flange 314a of the inner ring 314. Once in this position, the method can include bending a portion of the thrust washer 317 such that the thrust washer 317 then has a U-shaped profile, with a single axial portion and two radial portions on either end of the axial portion. After these steps, as shown in FIG. 7C, the thrust washer 317 is fully secured to the inner ring 314.

In an alternative configuration, a coating can be directly applied to the inner ring 314, and the thrust washer 317 can be omitted in order to provide an improved thrust bearing configuration. The coating on the inner ring 314 can include graphite and/or PTFE, and can be applied to a shoulder (i.e. radially outward flange 314a) on the inner ring 314 or the entire inner ring 314.

One of ordinary skill in the art would understand that instead of including a thrust washer, the inner ring or the inner sleeve themselves could include a coating, such as graphite or PTFE, that can be applied to relevant portion of the component (i.e. the flange directly facing the cage) or the entire component.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS differential assembly 1a
half-shaft 1b
gear box housing 1c
rubber boot 1d
bearing assembly 1e
tripod rollers 1f
bearing assembly 2a
rubber boot 2b
cap 2c
half-shaft 2d
clip band 2e
seal assembly 3a
bearing 3b
seal assembly 4a
bearing 4b
bearing assembly 10, 310, 410, 510
outer ring 12, 212, 312
first axial flange 12a, 112a
first radial flange 12b, 112b
second axial flange 12c,
second radial flange 12d
inner ring 14, 114, 314, 414, 514
radially outward flange 14a, 314a of inner ring
oil retention pocket 15
rolling elements 16, 316, 416,
inner sleeve 18, 318, 418, 518
seal assembly 20, 320, 420,
first sealing element 22
second sealing element 23
seal insert 24
radial flange 24a of seal insert
axial flange 24b of seal insert
bent portion 24c of seal insert
biasing element 26
cage 28, 128, 328, 428,
first axial stop face 30a for cage and rolling elements
second axial stop face 30b for cage and rolling elements
radial flange 42 of inner sleeve
slanted portion 113 of outer ring
first sealing lip 123a
second sealing lip 123b
radial flange 129 of cage
second axial stop face 130b of inner sleeve
radially inward flange 213
radial flange 312d of outer ring
raceway ring 313
axial portion 313a of raceway ring
radial flanges 313b, 313c of raceway ring
radial flange 314a of inner ring
second mating feature 314b
coating 314c
first axial side 314' of radial flange
second axial side 314" of radial flange
thrust washer 317, 417, 517
first mating feature 317a
body 317b
coating 317c
radial flange 518a of inner sleeve
first axial side 518' of radial flange
second axial side 518" of radial flange

What is claimed is:

1. A bearing assembly comprising:
an outer ring, an inner ring, a plurality of rolling elements supported between the outer ring and the inner ring, and a cage configured to retain the plurality of rolling elements; and
a thrust washer arranged on a first axial side of the plurality of rolling elements and the cage, the thrust washer being axially positioned between the cage and a radial flange of the outer ring, and the thrust washer being attached to the inner ring;
wherein the thrust washer is attached to a radial flange of the inner ring.

2. The bearing assembly according to claim 1, wherein the thrust washer is comprised of a body and a coating, wherein the body is formed from sheet metal and the coating is formed from graphite or polytetrafluoroethylene (PTFE).

3. The bearing assembly according to claim 1, wherein the thrust washer is configured to be arranged on both a first axial side and a second axial side of the radial flange of the inner ring.

4. The bearing assembly according to claim 1, wherein the thrust washer is attached to the inner ring via an interference fit.

5. The bearing assembly according to claim 1, wherein the thrust washer includes a first mating feature, the radial flange of the inner ring includes a second mating feature, and
the first mating feature and the second mating feature are configured to prevent relative movement between the thrust washer and the inner ring.

6. The bearing assembly according to claim 1, further comprising an inner sleeve arranged radially inward from the inner ring.

7. The bearing assembly according to claim 1, further comprising a seal assembly arranged on a second axial side of the plurality of rolling elements and the cage, the seal assembly providing a sealing interface with both the outer ring and the inner ring.

8. A bearing assembly comprising:
an outer ring, an inner ring, a plurality of rolling elements supported between the outer ring and the inner ring, and a cage configured to retain the plurality of rolling elements;
an inner sleeve arranged radially inward from the inner ring; and
a thrust washer arranged on a first axial side of the plurality of rolling elements and the cage, the thrust washer being axially positioned between the cage and a radial flange of the outer ring, and the thrust washer being attached to the inner sleeve.

9. The bearing assembly according to claim 8, wherein the thrust washer is attached to a radial flange of the inner sleeve.

10. The bearing assembly according to claim 9, wherein the thrust washer is configured to be arranged on a first axial side and a second axial side of the radial flange of the inner sleeve.

11. The bearing assembly according to claim 9, wherein the thrust washer is comprised of a body formed from sheet metal and a coating.

12. The bearing assembly according to claim 11, wherein the body has a thickness of 0.15 mm-1.30 mm.

13. The bearing assembly according to claim 9, wherein the thrust washer has a U-shaped profile.

14. The bearing assembly according to claim 9, wherein the thrust washer is attached to the inner sleeve via an interference fit.

15. A thrust washer-bearing ring combination comprising:
a thrust washer having a sheet metal body and a coating; and
a bearing ring having a raceway for supporting rolling elements and a radial flange;
wherein the thrust washer is attached to the radial flange of the bearing ring and has a U-shaped profile.

16. The thrust washer-bearing ring combination according to claim 15, wherein the thrust washer covers at least a portion of a first axial side and a second axial side of the radial flange of the bearing ring.

17. The thrust washer-bearing ring combination according to claim 15, wherein the thrust washer includes a first mating feature, and the radial flange of the bearing ring includes a second mating feature configured to mate with the first mating feature.

18. The thrust washer-bearing ring combination according to claim 17, wherein the first mating feature is formed as a tab and the second mating feature is formed as a slot.

19. The thrust washer-bearing ring combination according to claim 15, wherein the coating is formed from graphite or PTFE.

* * * * *